Patented Dec. 23, 1930

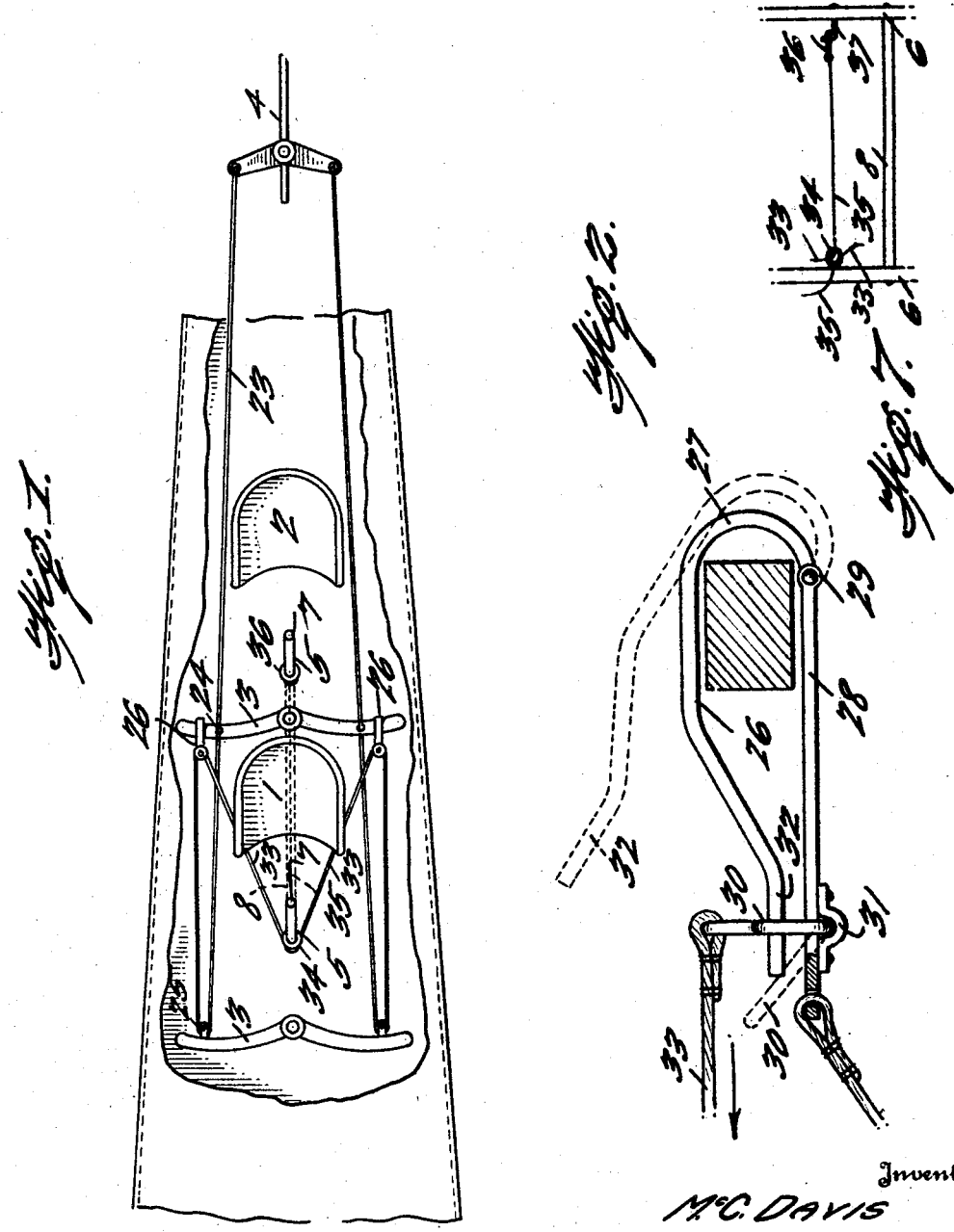

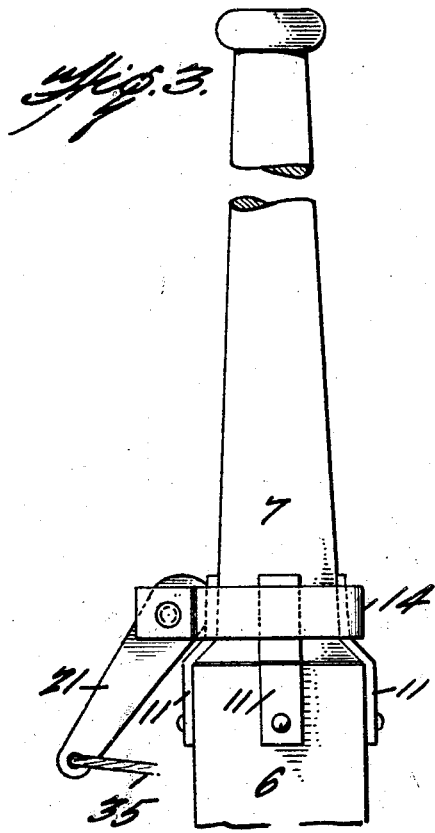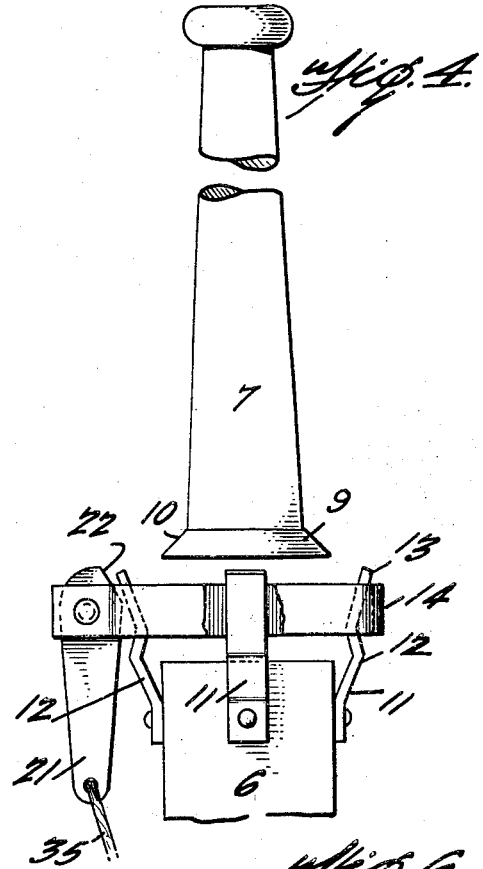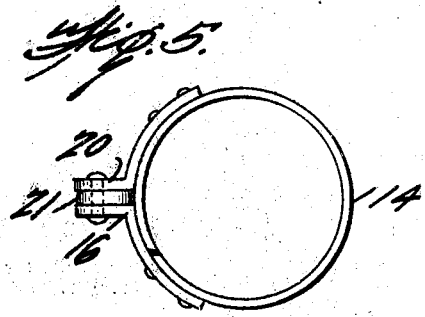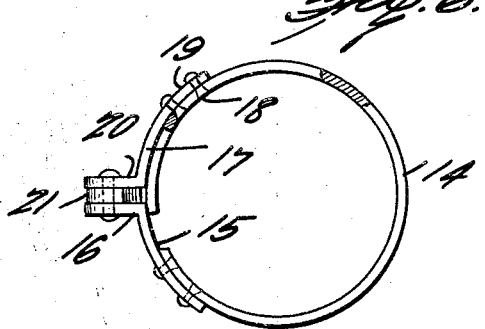

1,786,193

UNITED STATES PATENT OFFICE

McCLELLAN DAVIS, OF PORTLAND, OREGON

AEROPLANE-CONTROL DEVICE

Application filed September 4, 1928. Serial No. 303,783.

This invention is directed to an improvement in aeroplane control devices, particularly in that class of control devices used for purposes of instructing students in the art of handling the aeroplane.

As ordinarily provided in aeroplanes designed for the instruction of students, duplicate control devices are arranged ordinarily coupled together, whereby either the student or instructor or both may serve to control the aeroplane. Ordinarily a student is permitted control, subject, however, to the fact that the instructor has at his command the similar controls through which he assists and instructs the student in their proper use. It not infrequently happens that in an emergency the student, either through anxiety or fear, attempts either an improper control or freezes to the controls, so that the aeroplane is beyond the personal control of the instructor. Under these circumstances, a serious accident generally follows the inability of the instructor to control the aeroplane entirely independently of the student, and various means have been devised for permitting the student to control the aeroplane subject entirely to the will of the instructor, with means at the command of the instructor by which the control elements under the power of the student may be entirely disconnected from any control effect, whereby the instructor may at will gain complete and wholly independent control of the aeroplane.

The present invention, therefore, is directed to means for connecting the similar controls of the student and instructor, with such means so arranged that the instructor may at will relieve the control elements operated by the student from any effect on the aeroplane.

The invention is illustrated in the accompanying drawings, in which:

Figure 1 is a broken plan of an aeroplane showing sufficient of the detail to illustrate the present invention.

Figure 2 is an enlarged sectional view, partly in elevation, illustrating the means whereby the rudder control of the student is disconnected at the will of the instructor.

Figure 3 is a broken elevation of the joy stick forming part of the student's control, parts of the latter being shown in connected relation to permit control by the student.

Figure 4 is a similar view showing parts of the student's joy stick released from their connecting means to prevent further control by the student.

Figure 5 is a plan view of the clamping ring for holding the parts of the student's joy stick in connected relation, the ring being shown in operative or clamping position.

Figure 6 is a similar view, the ring being shown in open or release position.

Figure 7 is a detail of the instructor's control cable.

In aeroplanes designed more particularly for instruction, the fuselage is provided with two tandem arranged seats 1 and 2, the former being occupied by the student and the latter by the instructor. In advance of each seat is provided a foot lever 3 for controlling the rudder 4 of the aeroplane and a control rod or joy stick 5 for controlling the ailerons and other parts usually controlled by the joy stick.

The control means for the student, with which detail the invention is more particularly concerned, includes the joy stick 5 constructed of upper and lower sections 6 and 7, the former being connected to the joy stick 5 of the instructor by a rod 8, to insure simultaneous movement of the respective joy sticks. The upper section 7 of the joy stick of the student is, however, separable from the lower section 6 at the will of the instructor, so that when such separation takes place the elements of the aeroplane controlled by the joy stick are wholly beyond any actuation by the student.

To provide for this result, the lower end of the upper section 7 of the student's joy stick is formed with an enlarged base 9 to rest squarely upon the lower section 6, the margin of the enlarged base presenting an upwardly and inwardly inclined surface 10. Spring fingers 11 are secured to the section 6 of the stick, these fingers being normally influenced by their inherent resiliency to spread apart. Each finger is formed with a bearing portion 12 which, when the parts are in operative relation, engages squarely on the inclined surface 10 of the base 9 and so secures the sections 6 and 7 of the student's joy stick in fixed relation.

The fingers 11 extend above the engaging portions 12 as upright extensions 13 and a clamping ring is provided to engage these extensions. This ring, illustrated more particularly in Figures 5 and 6, includes a split ring 14 of an inherent resiliency, tending to spread the ring. Secured to one terminal of the ring is a strip 15 having a radially projecting lip 16. A corresponding strip 17 is movably secured through the medium of pins 18 fixed in the ring and passing through and headed beyond slots 19 in the strip 17. The strip 17 is also formed with a radially extending lip 20 disposed in parallelism with the lip 16.

An operating lever 21 is pivotally supported between and with relation to the lips 16 and 20, this lever having a cam edge 22 which, when the lever is operated in a direction away from the section 6, bears on the movable terminal of the split ring 14 and forces it toward the fixed terminal of such ring. In other words, when the lever 21 is operated as described, the clamping ring is reduced in diameter to an extent to exert pressure upon the upright extensions 13 of the fingers 11 and force said fingers to interlock with the base 9 of the stick section 7 and so fix the sections 6 and 7 as a rigid element. When operated in the opposite direction, that is, its free end moved toward the section 6, the clamping action of the lever is released and the ring 14 spreads under its own resiliency to thereby permit the fingers 11 to open and completely release the upper section 7 of the joy stick.

The foot lever control of the rudder by the student and instructor is through the medium of cables 23 which extend from the rudder to the foot lever of the instructor, being secured to the latter at 24. The cables 23 extend beyond the connection 24 to and around pulleys 25 on the foot lever 3 of the student and back to releasable connection, indicated at 26, on the foot lever of the instructor. From this connection it will be obvious that through the medium of the foot lever 3 the student may control the rudder as long as the releasable connection 26 is intact, the instructor of course having control of the rudder at all times through the fixed connection 24.

The releasable connection for the severance of the foot lever control by the student is illustrated more particularly in Figure 2 and comprises a hook-like element made up of a bar 27 which passes over and extends forwardly of the foot lever of the instructor adjacent each end of such lever, and a straight bar 28 to which the hook bar 27 is pivotally connected at 29. The rudder control 23 is terminally connected to the straight bar 28 after passing over the pulley 25. An eye 30 loosely connected at 31 to the bar 28 is adapted to fit over the terminal 32 of the hook bar 27, so that when the eye is engaged with the terminal of the hook bar, the terminals of the cables 23 are connected to the foot bar of the instructor and therefore form an anchor for these cables, permitting foot bar control by the student. If, however, the eyes 30 be thrown in the forward direction, the hook bar 27 is released, the terminals of the cables 23 are no longer anchored to the foot bar of the instructor, and operation of the rudder cables by the student is impossible.

To provide for control of the detachable connections 26 and of the release of the upper section of the joy stick by the instructor, cables 33 extend from the respective eye members 30 to and through a ring 34 at the lower end of the student's joy stick and are there connected to a cable 35 which extends rearwardly toward the joy stick of the instructor and is provided with a ring 36 to be connected over a hook 37 adjacent such joy stick. The end of the cable 35 extends forwardly beyond the connection of the cables 33 therewith and is connected at its forward end to the cam lever 21 of the joy stick connecting parts.

As constructed, it is apparent that so long as the parts remain intact, the student may, together with or independent of the instructor, control the aeroplane in the usual manner. If, however, at any time and for any purpose the instructor desires to maintain control of the aeroplane wholly independent of the student, he will simply release the ring 36 from the hook 37 and exert a pull on the cable 35. This will, through operation of the eye members 30, release the hook connections 26 and at the same time move the cam lever 21 into a position to relieve pressure upon the clamping ring 14. This ring will open, releasing the fingers 11 and immediately freeing the upper or handle end section of the student's joy stick and free the rear ends of the cables 23 from connection with the instructor's foot lever. The student, therefore, has no further control, either through the joy stick or foot lever, of the operative parts of the aeroplane and the latter is wholly within the operative control of the instructor as will be apparent.

What is claimed to be new is:

1. A dual control for aeroplanes, including connected joy sticks, one of said sticks being made in separable sections, clamping fingers carried by one of the sections and adapted to engage and interfit with the other section, said fingers being inherently tensioned to move to a position to release such other section, a ring adapted for contraction and expansion, said ring encircling the fingers, and means whereby the ring may be contracted to move the fingers into clamping cooperation with the other stick section.

2. A dual control for aeroplanes, including connected joy sticks, one of said sticks being made in separable sections, the uppermost section having a conical terminal to bear on the lowermost section, spring fingers carried by the lowermost section and formed to embrace and overlie the conical terminal of the uppermost section when the fingers are in clamping cooperation, a ring arranged for expansion and contraction and encircling the fingers, means carried by the ring and operative to cause the ring to contract to force the fingers into clamping cooperation with the conical terminal of the uppermost section, and a member operative from a remote position to actuate said means to permit expansion of the ring under the action of the spring fingers for releasing the clamping engagement of the fingers.

3. A dual control for aeroplanes, including foot levers arranged respectively for an instructor's position and for a student's position, rudder controlling cables connected to the foot lever for the instructor, said cables extending to and having sliding connection with the foot lever for the student, the cables beyond said sliding connection having releasable hook connection with the foot lever for the instructor, and means operative from a position adjacent the foot lever of the instructor for releasing the hook connection of the cable with the foot lever for the instructor, whereby to free the connection between the foot levers for the instructor and student without interrupting the rudder control by the foot lever for the instructor.

4. A dual control for aeroplanes, including an instructor's foot lever, a student's foot lever, connections between the instructor's foot lever and the rudder, a flexible connection extending from the instructor's foot lever to and having a sliding connection with the student's foot lever, a hook carried by the terminal of said connection to fit over the ends of the instructor's foot lever, the hook including a pivoted bill, a ring holding the bill in hooking cooperation with the instructor's foot lever, and a flexible connection extending within reach of the instructor for removing the ring to release the bill of the hook, whereby to free the connection between the instructor's foot lever and the student's foot lever.

In testimony whereof I affix my signature.

McCLELLAN DAVIS.